(12) United States Patent
Yeakley et al.

(10) Patent No.: US 7,218,480 B1
(45) Date of Patent: May 15, 2007

(54) MAGNETIC DETENT FOR TRANSDUCER POSITIONING MECHANISM

(75) Inventors: Darryl Wayne Yeakley, Erie, CO (US); Frank Goodknight, Niwot, CO (US)

(73) Assignee: Storage Technology Corporation, Louisville, CO (US)

( * ) Notice: Subject to any disclaimer, the term of this patent is extended or adjusted under 35 U.S.C. 154(b) by 384 days.

(21) Appl. No.: 10/990,598

(22) Filed: Nov. 17, 2004

(51) Int. Cl.
G11B 5/55 (2006.01)

(52) U.S. Cl. .................................... 360/261.1

(58) Field of Classification Search ............ 360/261.1, 360/261.2, 261.3, 266.6, 267.6, 265.1, 291
See application file for complete search history.

(56) References Cited

U.S. PATENT DOCUMENTS

| | | | |
|---|---|---|---|
| 215,614 | A | 5/1879 | Heighes et al. |
| 229,674 | A | 7/1880 | Condict, Jr. |
| 246,549 | A | 8/1881 | Perry |
| 4,660,120 | A * | 4/1987 | Manzke et al. .......... 360/256.3 |
| 5,361,182 | A * | 11/1994 | Sampietro et al. ....... 360/256.3 |
| 5,414,578 | A * | 5/1995 | Lian et al. .................. 360/291 |
| 5,793,573 | A * | 8/1998 | Eckberg et al. .......... 360/261.3 |
| 6,057,980 | A | 5/2000 | Todd et al. ................. 360/96.5 |
| 6,108,161 | A | 8/2000 | Todd et al. ................. 360/96.5 |
| 6,194,796 | B1 | 2/2001 | Yeakley ....................... 310/14 |
| 6,215,614 | B1 | 4/2001 | Todd et al. ................. 360/96.5 |
| 6,229,674 | B1 | 5/2001 | Todd ......................... 360/261.1 |
| 6,246,549 | B1 | 6/2001 | Todd et al. .............. 360/266.4 |
| 6,437,946 | B2 | 8/2002 | Todd ......................... 360/261.1 |
| 6,594,118 | B1 * | 7/2003 | Nayak et al. ............ 360/261.1 |
| 6,985,430 | B1 * | 1/2006 | Villiard et al. .............. 360/291 |
| 7,123,450 | B1 * | 10/2006 | Villiard et al. ........... 360/261.1 |

FOREIGN PATENT DOCUMENTS

EP 481654 A2 * 4/1992

* cited by examiner

Primary Examiner—William J Klimowicz
(74) Attorney, Agent, or Firm—Brooks Kushman P.C.

(57) ABSTRACT

In a tape data storage arrangement, a magnetic detent is provided to maintain a tape read/write head in selected positions with respect to the tape, during data transfer. The tape is mounted on a carriage movable between first and second positions, with respect to a support structure, and a detent member is fixably joined to the support structure. First and second detent components mounted on the carriage engage the detent member by means of a magnetic force, when the carriage is moved to the first and second positions, respectively. Usefully, the detent member is a magnet and the first and second components comprise steel. Alternatively, the detent member comprises steel, and the first and second components are both magnets.

20 Claims, 3 Drawing Sheets

MAGNETIC DETENT FOR TRANSDUCER POSITIONING MECHANISM

BACKGROUND OF THE INVENTION

1. Field of the Invention

The invention disclosed and claimed herein generally relates to detent apparatus for a positioning mechanism or actuator assembly for a tape transducer. More particularly, the invention pertains to detent apparatus of the above type wherein a magnetic force is used to firmly retain a tape transducer in one or more selected positions. Even more particularly, the invention pertains to detent apparatus of the above type wherein the tape transducer comprises a read/write head for a data storage arrangement using magnetic tape.

2. Background of the Invention

In a common data storage arrangement using magnetic tape, it is necessary to move the read/write head to different positions with respect to the tape. More particularly, the tape head, which is provided to selectively read data from and write data onto the tape, may need to be moved laterally across the width of the data storage tape. This may be necessary to place the head in operative relationship with any of two or more data bands or tracks positioned along the tape length.

In view of the above requirements, tape head actuators have been developed, to move the tape head from one band to the other. Some of these actuators have two modes of operation, a first mode for moving the tape head between bands, and a second mode for maintaining alignment between the head and a particular data band. Prior art devices of this type are disclosed, for example, in U.S. Pat. No. 6,437,946, issued Aug. 20, 2002.

In prior art tape head actuators as described above, a latching or holding mechanism of some type is generally provided to retain the tape head in place, after the head has been moved into position with respect to one or another of the bands. The retaining mechanisms currently available tend to use spring retainers or detents, and have mechanical components in contact with one another. Vibration or relative motion generally occurs in a tape actuator during tape movement. As a result, reliability and performance problems have been encountered, resulting from such things as component fatigue, component wear and unpredictable frictional forces at detent component interfaces. More particularly, the vibratory movements cause retainer components to rub together, generating friction. Moreover, the rubbing action can cause undesirable debris to be generated and to fall into the actuator or onto the tape or tape head. Also, use of a spring in a head actuator retainer or detent can allow vibrating motion that is of an unpredictable nature.

SUMMARY OF THE INVENTION

An improved detent design for a tape actuator or positioning mechanism is provided, that eliminates relative contact motion between interfacing detent components. The detent design thereby substantially reduces or eliminates friction in the detent mechanism. In addition, the number of parts in the detent assembly is reduced significantly, compared to prior art configurations. Accordingly, reliability and performance are increased, while costs may be reduced. In one useful embodiment, the detent apparatus comprises a support structure, and a carriage disposed to move between a first position relative to the support structure and at least a second position relative thereto, in order to selectively position and re-position the tape transducer. A detent member is fixably joined to the support structure, and first and second detent components are mounted to the carriage for movement therewith. The first and second detent components are each disposed to engage the fixably joined detent member by means of a magnetic force, when the carriage is moved to the first and second positions, respectively. The magnetic engagements respectively act to retain the carriage at the first and second positions.

BRIEF DESCRIPTION OF THE DRAWINGS

The novel features believed characteristic of the invention are set forth in the appended claims. The invention itself, however, as well as a preferred mode of use and further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
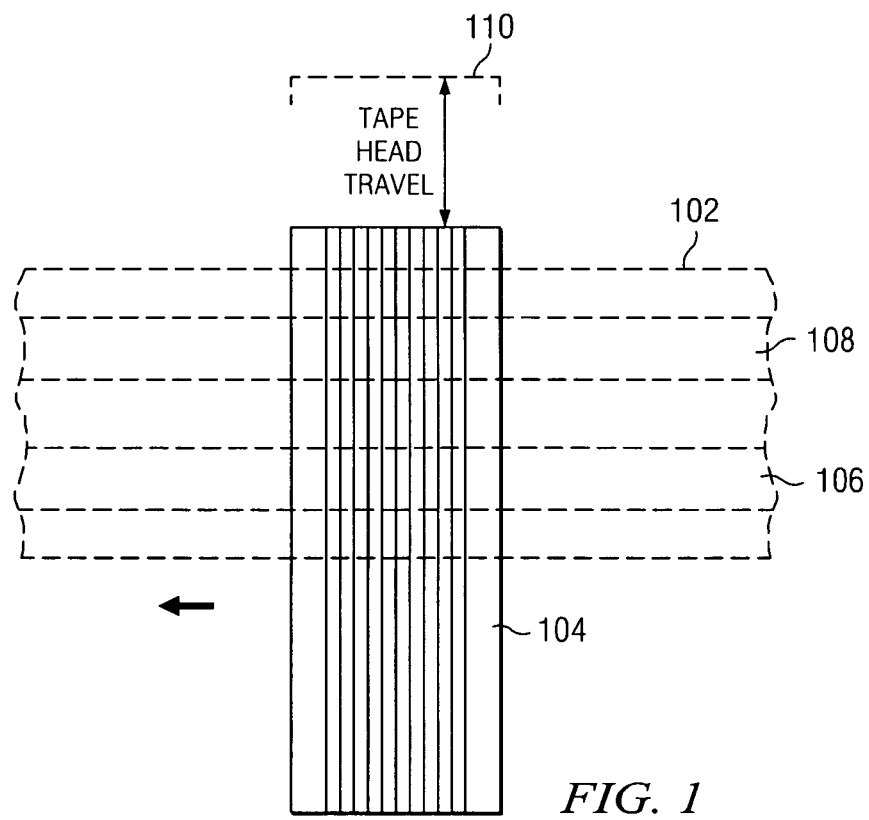
FIG. 1 is a schematic view showing a read/write tape head having multiple positions that may be used with an embodiment of the invention.

Referring to FIG. 1, there is shown a section of magnetic data storage tape 102, moving across a tape transducer such as a read/write head 104. The tape head 104 selectively reads data from, and writes data onto, the moving tape 102. More particularly, data is exchanged between tape head 104 and a band or track 106 included in tape 102, when tape head 104 is in a lower position as shown in FIG. 1. However, when tape head 104 is moved along a path of travel to a position 110, the tape head reads data from or writes data onto a tape track 108. The embodiment of the invention disclosed hereinafter is constructed to hold or retain tape head 104 in a selected or desired one of its two positions.

Figures 2, 3:
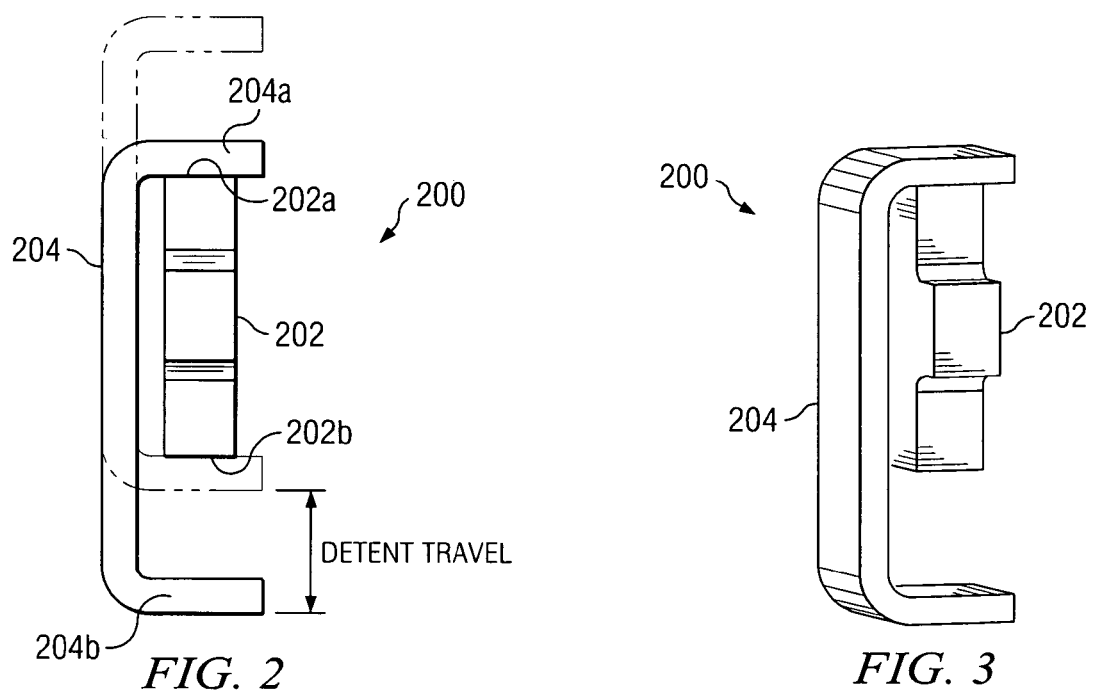
FIG. 2 is a side view showing an embodiment of the invention.
FIG. 3 is a perspective view showing the embodiment of FIG. 2.

Referring to FIG. 2, there is shown a magnetic detent mechanism 200, comprising an embodiment of the invention, provided with a permanent magnet 202. Magnet 202 has flat or planar end surfaces 202a and 202b, in opposing relationship with one another. FIG. 2 further shows the magnetic detent 200 also provided with an integral steel member 204, having end elements 204a and 204b. As disclosed hereinafter in further detail, steel member 204 is mounted for movement with respect to magnet member 202 along a detent path of travel. Moreover, when steel member 204 is moved to the lowest extent of its travel path, a planar surface of steel end element 204a is brought into abutting contact with planar magnet end surface 202a. Thereupon, the magnetic force provided by magnet 202 acts to lock or retain magnet 202 and steel member 204 into firm, fixed relationship with each other. Magnet 202 and the abutting planar surfaces are respectively selected to provide a magnetic force that will be sufficient to ensure that magnet 202 and steel member 204 remain fixed together, with little or no rubbing therebetween, until a counter force is applied to intentionally overcome the magnetic force.

When such counter force is applied, steel member 204 is moved upwardly along its path of travel, as viewed in FIG. 1, until a planar surface of end element 204b and magnet end surface 202b are brought into abutting contact with one another. Thereupon, the magnetic force provided by magnet 202 will retain the magnet 202 and steel member 204 in this new position.

FIG. 3 shows a further view of detent magnet 202 and steel detent member 204 of magnetic detent 200.

Figure 4:
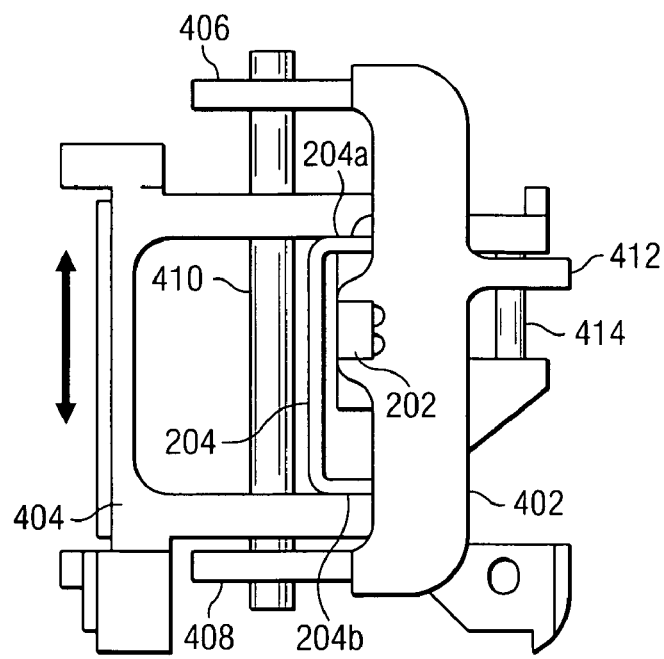
FIG. 4 is a side view showing the embodiment of FIG. 2 in place within a tape head actuator assembly.
Figure 5:
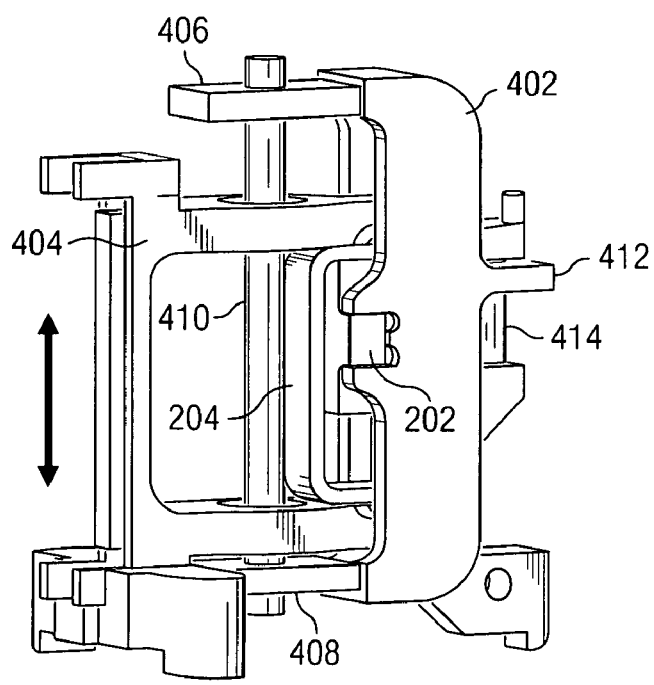
FIG. 5 is a perspective view showing the actuator assembly of FIG. 4.

Referring to FIGS. 4 and 5 together, there is shown detent magnet 202 fixably joined to an outer carriage 402. There is further shown steel detent member 204 fixably attached to an inner carriage 404, wherein inner carriage 404 is constrained to limited linear movement with respect to outer carriage 402. This movement is upward or downward, as viewed in FIGS. 4 and 5. More particularly, outer carriage 402 is provided with brackets 406 and 408, that collectively support a guide rail 410. Outer carriage 402 is further provided with a bracket 412 that supports a guide rail 414. Inner carriage 404, and steel detent member 204 joined thereto, are disposed to move along guide rails 410 and 414, between their upper and lower limits of travel. These limits are determined or established by the specific construction of outer carriage 402.

As described hereinafter in connection with FIG. 6, inner carriage 404 is designed to support and carry read/write tape head 104. Accordingly, the lower and upper limits of travel of inner carriage 404 are judiciously selected, in order to position tape head 104 to exchange data with either tape band 106 or 108, as inner carriage 404 is moved to its lower or upper limit, respectively.

Detent magnet 202 and steel detent member 204 are respectively mounted so that end element 204a and magnet surface 202a are brought into closely abutting contact when inner carriage 404 is moved to its lower limit. The magnetic retention force that is thereby established between steel detent member 204 and detent magnet 202 will act to hold both the inner carriage 404 and tape head 104 mounted thereon firmly in this position. Similarly, when inner carriage 404 is moved to its upper limit, end element 204b and magnet surface 202b are brought into contact, to likewise establish the magnetic force between magnet 202 and steel member 204, whereby inner carriage 404 and tape head 104 will be held in this latter position.

Figure 6:
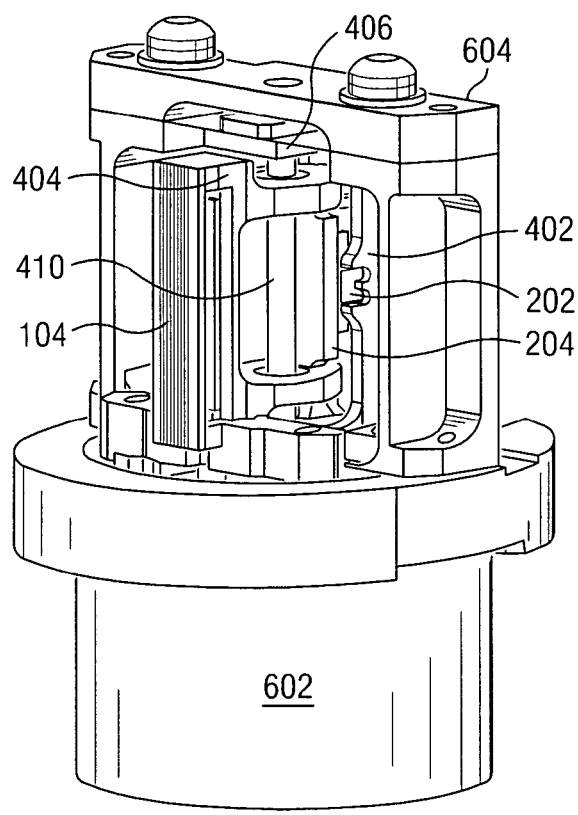
FIG. 6 is a perspective view showing the read/write head of FIG. 1 positioned upon the actuator assembly of FIG. 4.

Referring to FIG. 6, there is shown outer carriage 402, inner carriage 404 and components 202 and 204 of magnetic detent 200 supported upon a linear drive motor 602, and held in place thereon by means of a frame 604. FIG. 6 also shows read/write tape head 104 mounted on inner carriage 404. A linkage (not shown) is provided between motor 602 and inner carriage 404, to enable linear motor 602 to move inner carriage 404, and to thus move tape head 104 between its respective positions of operation, as desired. As described above, magnetic detent 200 operates to lock tape head 104 into a selected one of its positions with respect to the magnetic tape. The locking force provided by magnetic detent 200 will continue to act, until overcome by operation of motor 602 to re-position the inner carriage 404 and tape head 104.

Referring further to FIG. 6, there is shown outer carriage 402 supported in frame 604 by means of brackets such as bracket 406. Each of these brackets provides flexure between outer carriage 402 and frame 604, so that outer carriage 402 is allowed to move slightly with respect to frame 604. When inner carriage 404 is held in one of its positions by magnetic detent 200, as described above, the holding force provided by the magnetic detent will be sufficient to move inner carriage 404 and tape head 104 in unison with outer carriage 402. This, in turn, allows tape head 104 to move slightly, to adapt to vibrations associated with movements of the data storage tape 102.

Figures 7, 8:
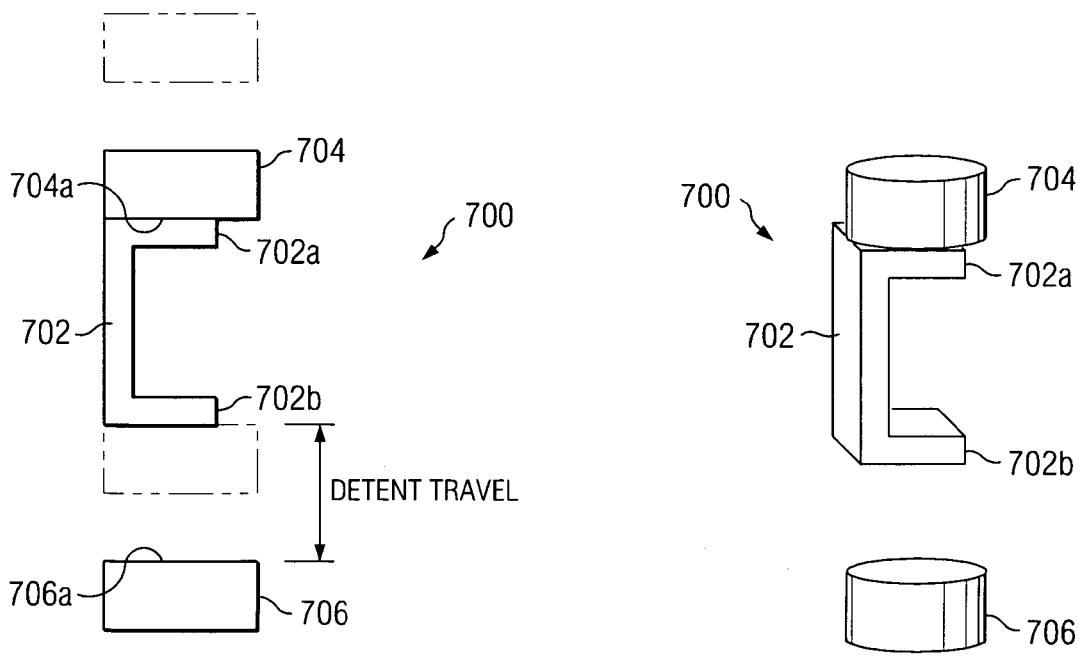
FIG. 7 is a side view showing a further embodiment of the invention.
FIG. 8 is a perspective view showing the embodiment of FIG. 7.

Referring to FIGS. 7 and 8 together, there is shown an alternative magnetic detent 700, comprising a second embodiment of the invention. Magnetic detent 700 is provided with an integral steel detent member 702, having end elements 702a and 702b, each provided with an outwardly facing planar surface. Detent 700 is further provided with magnet components 704 and 706, each comprising a permanent magnet. Magnet 704 has a planar surface 704a in facing relationship with the planar surface of steel end element 702a, and magnet 706 has a planar surface 706a in facing relationship with the planar surface of steel end member 702b.

In substituting magnetic detent 700 for the previously described magnetic detent 200, the steel member 702, rather than detent magnet 202, would be fixably joined to outer carriage 402. Magnet components 704 and 706 would each be attached to inner carriage 404, for movement therewith, instead of attaching steel member 204 thereto. Usefully, magnet 704 would be joined to inner carriage 404 at the point of attachment thereto of end element 204a, as shown by FIG. 4. Similarly, magnet 706 would be joined to inner carriage 404 at the point of attachment thereto of end element 204b, as further shown by FIG. 4.

In the arrangement shown in FIGS. 7 and 8, movement of inner carriage 404 to its lowest position would bring the planar end surface of steel end member 702a into abutting contact with planar surface 704a. Thereupon, the magnetic force provided by magnet 704 acts to lock or retain magnet 704 and steel detent member 702 in fixed relationship with each other. When an upward force is applied to inner carriage 404 by motor 602, the magnetic force between magnet 704 and steel member 702 is overcome. Magnets 704 and 706 move upwardly with inner carriage 404, along the detent path of travel, until planar magnet surface 706a and the planer surface of end element 702b are brought into abutting contact with one another, to establish a retentive magnetic force therebetween.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. Detent apparatus for a tape transducer positioning mechanism comprising:
   a support structure;
   a carriage disposed for movement between at least first and second positions relative to said support structure, to selectively position said tape transducer;
   a detent member fixably joined to said support structure; and first and second detent components mounted to said carriage for movement therewith, said first and second detent components each disposed to engage said fixably joined detent member by means of a magnetic force, when said carriage is moved to said first and said second positions, respectively, said magnetic engagements respectively acting to retain said carriage in said first and second positions.

2. The detent apparatus of claim 1, wherein:
said fixably joined detent member comprises a magnet, and said first and second detent components are respectively formed of steel.

3. The detent apparatus of claim 2, wherein:
said first and second detent components comprise spaced apart end components of an integral structure formed of steel.

4. The detent apparatus of claim 1, wherein:
said fixably joined detent member comprises a structure formed of steel, and said first and second detent components each comprises a magnet.

5. The detent apparatus of claim 1, wherein:
said carriage is disposed to move along a linear path of travel between said first and second positions, and said first and second detent components are selectively spaced apart from one another along the direction of said path of travel.

6. The detent apparatus of claim 5, wherein:
an actuator is joined to said carriage to move said carriage between said first and second positions.

7. The detent apparatus of claim 6, wherein:
said carriage comprises an inner carriage, and said support structure comprises an outer carriage mounted for movement; and
said detent member cooperatively acts with said first and second detent components, when said inner carriage is moved to said first and second positions, respectively, to join said inner carriage to said outer carriage for movement in unison.

8. The detent apparatus of claim 6, wherein:
said tape transducer comprises a magnetic tape read/write head, and said carriage is selectively moved to said first and second positions to enable said read/write head to exchange data with first and second bands, respectively, of a magnetic tape.

9. A detent apparatus for a tape transducer positioning mechanism comprising:
a first support structure;
a second support structure disposed to carry said tape transducer, and supported for movement with respect to said first support structure;
an actuator coupled to move said second support structure between first and second positions with respect to said first support structure;
a detent member fixably mounted to a specified one of said support structures; and
first and second detent components fixably mounted to the other of said support structures, said first detent component disposed to establish a magnetic engagement with said detent member when said second support structure is moved to said first position, said second detent component disposed to establish a magnetic engagement with said detent member when said second support structure is moved to said second position, and said magnetic engagements acting to retain said second support structure at said first and second positions, respectively.

10. The detent apparatus of claim 9, wherein:
said detent member is fixably mounted on said first support structure, and said first and second detent components are fixably mounted on said second support structure.

11. The detent apparatus of claim 9, wherein:
said detent member is fixably mounted on said second support structure, and said first and second detent components are fixably mounted on said first support structure.

12. The detent apparatus for claim 9, wherein:
said detent member comprises a selected permanent magnet, and said first and second detent components respectively comprise steel components that are spaced apart from one another.

13. The detent apparatus of claim 12, wherein:
said magnet is provided with opposing first and second planar magnet surfaces;
said first and second detent components comprise first and second opposing end elements of an integral steel structure, said first and second end elements provided with planar surfaces in facing relationship with said first and second planar magnet surfaces, respectively, of said magnet; and
said magnetic engagements are respectively established by bringing said first planar magnet surface and said planar surface of said first end element into abutting contact with one another, and similarly bringing said second planar magnet surface and said planar surface of second end element into abutting contact with one another.

14. The detent apparatus of claim 9, wherein:
said detent member comprises a steel member, and said first and second components comprise first and second magnets, respectively.

15. The detent apparatus of claim 14, wherein:
said first and second magnets are provided with a first planar magnet surface and a second planar magnet surface, respectively;
said steel member is provided with first and second opposing end elements, said first and second end elements provided with planar surfaces in facing relationship with said first and second planar magnet surfaces, respectively of said magnets; and
said magnetic engagements are respectively established by bringing said first planar magnet surface and said planar surface of said first end element into abutting contact with one another, and similarly bringing said second planar magnet surface and said planar surface of said second end element into abutting contact with one another.

16. The detent apparatus of claim 9, wherein:
said tape transducer comprises a read/write magnetic tape head, and said actuator comprises a linear motor.

17. In a tape transducer positioning mechanism provided with a support structure, and further provided with a carriage disposed for movement between at least first and second positions relative to the support structure to selectively position the tape transducer, a detent apparatus comprising:
a detent member fixably joined to said support structure;
a first detent component mounted to said carriage to engage said fixably joined detent member by means of a magnetic force, when said carriage is moved to said first position, to retain said carriage in said first position; and a second detent component mounted to said carriage in spaced relation with said first detent component to engage said fixably joined detent member by means of a magnetic force, when said carriage is moved to said second position, to retain said carriage in said second position.

18. The detent apparatus of claim 17, wherein:

said fixably joined detent member comprises a magnet, and said first and second detent components are respectively formed of steel.

19. The detent apparatus of claim 18, wherein:

said first and second detent components comprise end components of an integral structure formed of steel.

20. The detent apparatus of claim 17, wherein:

said fixably joined detent member comprises a structure formed of steel, and said first and second detent components each comprises a magnet.

\* \* \* \* \*